(12) United States Patent
Kim

(10) Patent No.: US 11,945,396 B2
(45) Date of Patent: Apr. 2, 2024

(54) AIRBAG CUSHION AND AIRBAG APPARATUS FOR PASSENGER SEAT INCLUDING THE SAME

(71) Applicant: HYUNDAI MOBIS CO., LTD., Seoul (KR)

(72) Inventor: Su Hyun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/930,359

(22) Filed: Sep. 7, 2022

(65) Prior Publication Data

US 2023/0356687 A1 Nov. 9, 2023

(30) Foreign Application Priority Data

May 9, 2022 (KR) .................. 10-2022-0056617

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01); *B60R 2021/2395* (2013.01)

(58) Field of Classification Search
CPC . B60R 21/205; B60R 21/2338; B60R 21/239; B60R 2021/23382; B60R 2021/23576; B60R 2021/2395
See application file for complete search history.

(56) References Cited

U.S. PATENT DOCUMENTS

| | | | | |
|---|---|---|---|---|
| 5,405,166 A | * | 4/1995 | Rogerson | B60R 21/239 280/739 |
| 6,095,557 A | * | 8/2000 | Takimoto | B60R 21/2338 280/739 |
| 7,568,729 B2 | * | 8/2009 | Schnieder | B60R 21/2338 280/739 |
| 7,597,356 B2 | * | 10/2009 | Williams | B60R 21/2338 280/739 |
| 7,658,407 B2 | * | 2/2010 | Ford | B60R 21/239 280/739 |

(Continued)

FOREIGN PATENT DOCUMENTS

| | | |
|---|---|---|
| JP | 2006-096322 | 4/2006 |
| JP | 2008-265721 | 11/2008 |
| KR | 2019-0127201 | 11/2019 |

OTHER PUBLICATIONS

English Language Abstract of KR 2019-0127201 published Nov. 13, 2019.

(Continued)

*Primary Examiner* — Laura Freedman
(74) *Attorney, Agent, or Firm* — DLA Piper LLP (US)

(57) ABSTRACT

An airbag cushion and an airbag apparatus for a passenger seat including the same. A side panel portion of the airbag cushion is divided into a first panel portion, which is disposed at an upper position, and a second panel portion, which is disposed at a lower position, an open gap communicating with the outside is formed in an overlap region between the first panel portion and the second panel portion, and a low-risk deployment (LRD) vent for the airbag cushion is formed using the open gap. Accordingly, the configuration for forming the LRD vent is simplified.

18 Claims, 8 Drawing Sheets

(56) References Cited

U.S. PATENT DOCUMENTS

| | | | | |
|---|---|---|---|---|
| 7,726,685 B2* | 6/2010 | Abe | ................... | B60R 21/2338 |
| | | | | 280/736 |
| 7,731,233 B2* | 6/2010 | Schneider | ............. | B60R 21/239 |
| | | | | 280/739 |
| 7,946,613 B2* | 5/2011 | Rose | ................... | B60R 21/239 |
| | | | | 280/729 |
| 8,226,118 B2* | 7/2012 | Rose | .................. | B60R 21/2338 |
| | | | | 280/743.2 |
| 9,039,039 B2* | 5/2015 | Higuchi | ................ | B60R 21/239 |
| | | | | 280/739 |
| 9,676,364 B2* | 6/2017 | Williams | .............. | B60R 21/239 |
| 10,093,270 B2* | 10/2018 | Hatfield | ................ | B60R 21/239 |
| 10,427,639 B2* | 10/2019 | Williams | .............. | B60R 21/239 |
| 10,647,287 B2* | 5/2020 | Komatsu | ............... | B60R 21/233 |

OTHER PUBLICATIONS

Korean Office Action dated Dec. 19, 2023 issued in 10-2022-0056617.

\* cited by examiner

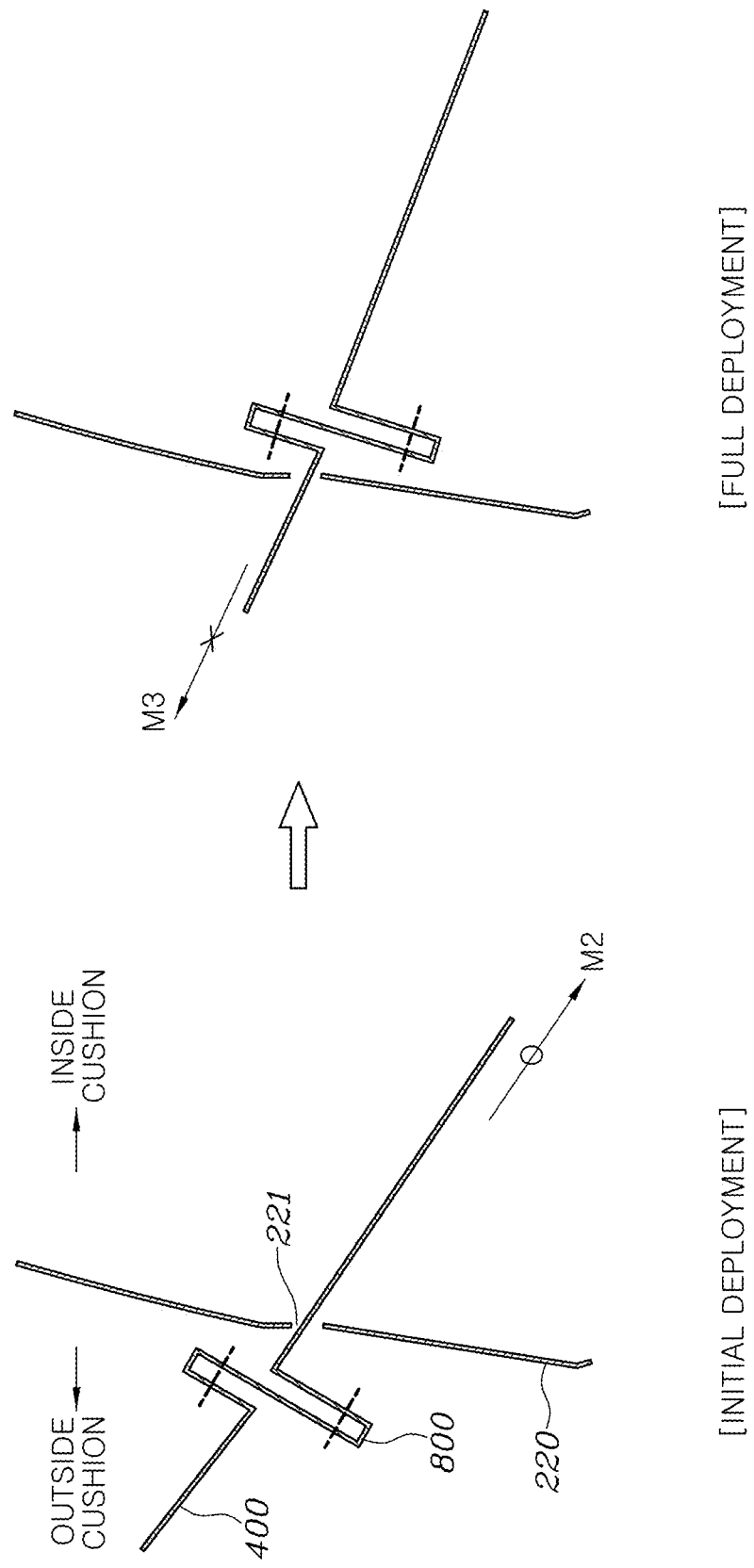

AIRBAG CUSHION AND AIRBAG APPARATUS FOR PASSENGER SEAT INCLUDING THE SAME

CROSS-REFERENCE TO RELATED APPLICATION

This application claims the priority benefit of Korean Patent Application No. 10-2022-0056617, filed on May 9, 2022 in the Korean Intellectual Property Office, the disclosure of which is incorporated herein by reference.

BACKGROUND OF THE INVENTION

Field of the Invention

The present invention relates to an airbag cushion and an airbag apparatus for a passenger seat including the same, and more particularly to an airbag cushion and an airbag apparatus for a passenger seat including the same, in which a side panel portion of the airbag cushion is divided into a first panel portion, which is disposed at an upper position, and a second panel portion, which is disposed at a lower position, and a low-risk deployment (LRD) vent is formed using the first panel portion and the second panel portion.

Description of the Related Art

Generally, a vehicle is equipped with various kinds of airbag apparatuses for protecting occupants in the event of an accident. Among them, an airbag apparatus for a front passenger seat is mounted in the space in a crash pad, and is deployed toward a passenger sitting in the front passenger seat in the event of a collision, thereby protecting the passenger in the front passenger seat.

The airbag apparatus for a passenger seat is provided with an active vent and an LRD vent.

In the event of a collision, an airbag for a passenger seat is deployed in order to protect a passenger. However, if the amount of gas charged into the airbag is greater than necessary, the head injury criterion value of the passenger increases, and thus the passenger is more likely to be injured. In order to prevent this problem, an active vent is connected to a separate tether release unit (TRU). When the internal pressure in an airbag cushion exceeds the required level, the TRU is operated, and accordingly, the active vent is opened so that gas is vented therethrough, thereby reducing the internal pressure in the airbag cushion. Accordingly, the head injury criterion value of the passenger at the time of collision of the passenger's head with the airbag cushion is reduced, and consequently, the risk of injury to the passenger's head is reduced.

In the case in which a child from about 3 years to about 6 years in age sits in the passenger seat, an LRD vent serves to prevent the child from being injured by the deployed airbag. When the airbag is initially deployed, the LRD vent is opened in order to vent gas therethrough until the airbag cushion is fully deployed, thereby reducing the internal pressure in the airbag cushion and thus alleviating impacts, and when the airbag cushion is fully deployed, the LRD vent is closed in order to maintain the internal pressure in the airbag cushion, thereby protecting the passenger.

However, in the case of a conventional airbag apparatus for a passenger seat provided with an LRD vent, the number of parts is large, and a structure for connecting the parts and a sewing structure are complicated, thus making it difficult to change the size or the design of the airbag apparatus for the purpose of improving injury prevention performance. Further, parts protruding outside a cushion occupy a large area, which is disadvantageous from the aspect of folding and packaging.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide an airbag cushion and an airbag apparatus for a passenger seat including the same, in which a side panel portion of the airbag cushion is divided into a first panel portion, which is disposed at an upper position, and a second panel portion, which is disposed at a lower position, an open gap communicating with the outside is formed in an overlap region between the first panel portion and the second panel portion, and an LRD vent for the airbag cushion is formed using the open gap, thereby simplifying the configuration for forming the LRD vent, reducing the number of parts, simplifying the structure for connecting the parts, making it easy to change the size or the design of the apparatus for the purpose of improving injury prevention performance, and minimizing the size of the area occupied by parts protruding outside the cushion, consequently making the apparatus advantageous from the aspect of folding and packaging.

In accordance with an aspect of the present invention, the above and other objects can be accomplished by the provision of an airbag cushion including a side panel portion, which forms the side surface of the airbag cushion and includes a first panel portion and a second panel portion. The first panel portion and the second panel portion are connected to each other via sewn sections formed by sewing predetermined parts of the first panel portion and predetermined parts of the second panel portion to each other, and have a non-sewn section therebetween. In the non-sewn section, the first panel portion and the second panel portion have regions overlapping each other to form an overlap region, and the overlap region forms an open gap until the airbag cushion is fully deployed in order to vent an airbag gas outside therethrough.

The first panel portion and the second panel portion may be disposed in the upward-downward direction, the sewn sections may correspond to a front boundary portion and a rear boundary portion between the first panel portion and the second panel portion, and the overlap region may correspond to an intermediate section between the sewn sections.

The first panel portion may be located above the second panel portion, and may be sewn at front and rear portions thereof to the second panel portion to form the sewn sections. The first panel portion may have a middle region other than the sewn sections, and the middle region may cover the outer surface of the second panel portion to form the overlap region.

The airbag cushion may further include a tether interconnecting the left upper end and the right upper end of the second panel portion located inside the overlap region. When the airbag cushion is deployed, the tether may pull the left upper end and the right upper end of the second panel portion in the inward direction to expand the open gap formed in the overlap region.

The airbag cushion may further include a second-panel-reinforcing member located between each of two ends of the tether and the second panel portion and integrally sewn to the tether and the second panel portion.

The airbag cushion may further include a cord interconnecting the left lower end and the right lower end of the first panel portion located outside the overlap region. When the airbag cushion is fully deployed, tension may be generated in the cord so that the first panel portion is brought into close contact with the second panel portion in the overlap region, whereby the open gap formed in the overlap region may be closed to stop venting of the airbag gas outside therethrough, and internal airtightness of the airbag cushion may be secured.

The cord may have two ends respectively sewn to the left lower end and the right lower end of the first panel portion located outside the overlap region, may be inserted into the second panel portion from outside through a slit formed in the second panel portion, and may have a middle portion coupled to the lower end of a main center panel portion.

The airbag cushion may further include a slit-reinforcing member coupled to a portion having the slit formed therein in the second panel portion.

The cord may be provided with a separate-type stopper sewn thereto. Before the airbag cushion is deployed, the separate-type stopper may be located outside the second panel portion. When the airbag cushion is deployed and tension is generated in the cord, the separate-type stopper may be inserted into the second panel portion through the slit in the second panel portion. When the airbag cushion is fully deployed, the separate-type stopper may be caught and fixed by the slit in the second panel portion, and may not escape out of the second panel portion.

The separate-type stopper may be formed as an elastic member configured to be deformed when external force is applied thereto and to be restored when the external force is removed. When no external force is applied thereto, the separate-type stopper may have a larger size than the slit in the second panel portion.

The cord may be provided with an integral-type stopper integrally formed therewith. Before the airbag cushion is deployed, the integral-type stopper may be located outside the second panel portion. When the airbag cushion is deployed and tension is generated in the cord, the integral-type stopper may be inserted into the second panel portion through the slit in the second panel portion. When the airbag cushion is fully deployed, the integral-type stopper may be caught and fixed by the slit in the second panel portion, and may not escape out of the second panel portion.

In accordance with another aspect of the present invention, there is provided an airbag cushion including a main center panel portion and a pair of side panel portions, which are coupled to both sides of the main center panel portion and each of which includes a first panel portion located at an upper position and a second panel portion separately provided from the first panel portion and located at a lower position. The first panel portion and the second panel portion are connected to each other via sewn sections formed by sewing predetermined parts of the first panel portion and predetermined parts of the second panel portion to each other, and have regions overlapping each other to form an overlap region. The overlap region between the first panel portion and the second panel portion has an open gap communicating with the outside.

The open gap formed between the first panel portion and the second panel portion may be maintained in an open state until the airbag cushion is fully deployed to vent an airbag gas outside therethrough. When the airbag cushion is fully deployed, the first panel portion may be brought into close contact with the second panel portion, and the open gap may be closed to stop venting of the airbag gas outside therethrough.

The airbag cushion may further include a tether interconnecting the left upper end and the right upper end of the second panel portion located inside the overlap region, and a cord interconnecting the left lower end and the right lower end of the first panel portion located outside the overlap region.

When the airbag cushion is deployed, the tether may pull the left upper end and the right upper end of the second panel portion in the inward direction to expand the open gap formed in the overlap region.

When the airbag cushion is fully deployed, tension may be generated in the cord so that the first panel portion is brought into close contact with the second panel portion in the overlap region, whereby the open gap formed in the overlap region may be closed to stop venting of the airbag gas outside therethrough, and internal airtightness of the airbag cushion may be secured.

In accordance with a further aspect of the present invention, there is provided an airbag apparatus for a passenger seat, including an airbag cushion, which includes a side panel portion forming both side surfaces thereof and including a first panel portion located at an upper position and a second panel portion located at a lower position, which are connected to each other via sewn sections formed by sewing predetermined parts of the first panel portion and predetermined parts of the second panel portion to each other and have a non-sewn section therebetween, which is formed at middle parts of the first panel portion and the second panel portion and forms an overlap region having an open gap communicating with the outside, an inflator coupled to the airbag cushion and configured to generate an airbag gas, and an airbag control unit configured to control operation of the inflator.

The airbag cushion may further include a tether interconnecting the left upper end and the right upper end of the second panel portion located inside the overlap region. When the airbag cushion is deployed, the tether may pull the left upper end and the right upper end of the second panel portion in the inward direction to expand the open gap formed in the overlap region.

The airbag cushion may further include a cord interconnecting the left lower end and the right lower end of the first panel portion located outside the overlap region. When the airbag cushion is fully deployed, tension may be generated in the cord so that the first panel portion is brought into close contact with the second panel portion in the overlap region, whereby the open gap formed in the overlap region may be closed to stop venting of the airbag gas outside therethrough, and internal airtightness of the airbag cushion may be secured.

BRIEF DESCRIPTION OF THE DRAWINGS

The above and other objects, features, and other advantages of the present invention will be more clearly understood from the following detailed description taken in conjunction with the accompanying drawings, in which:

FIGS. 7 and 8 are views for explaining a separate-type stopper and an integral-type stopper according to the present invention.

DETAILED DESCRIPTION OF THE PREFERRED EMBODIMENTS

Figure 1:
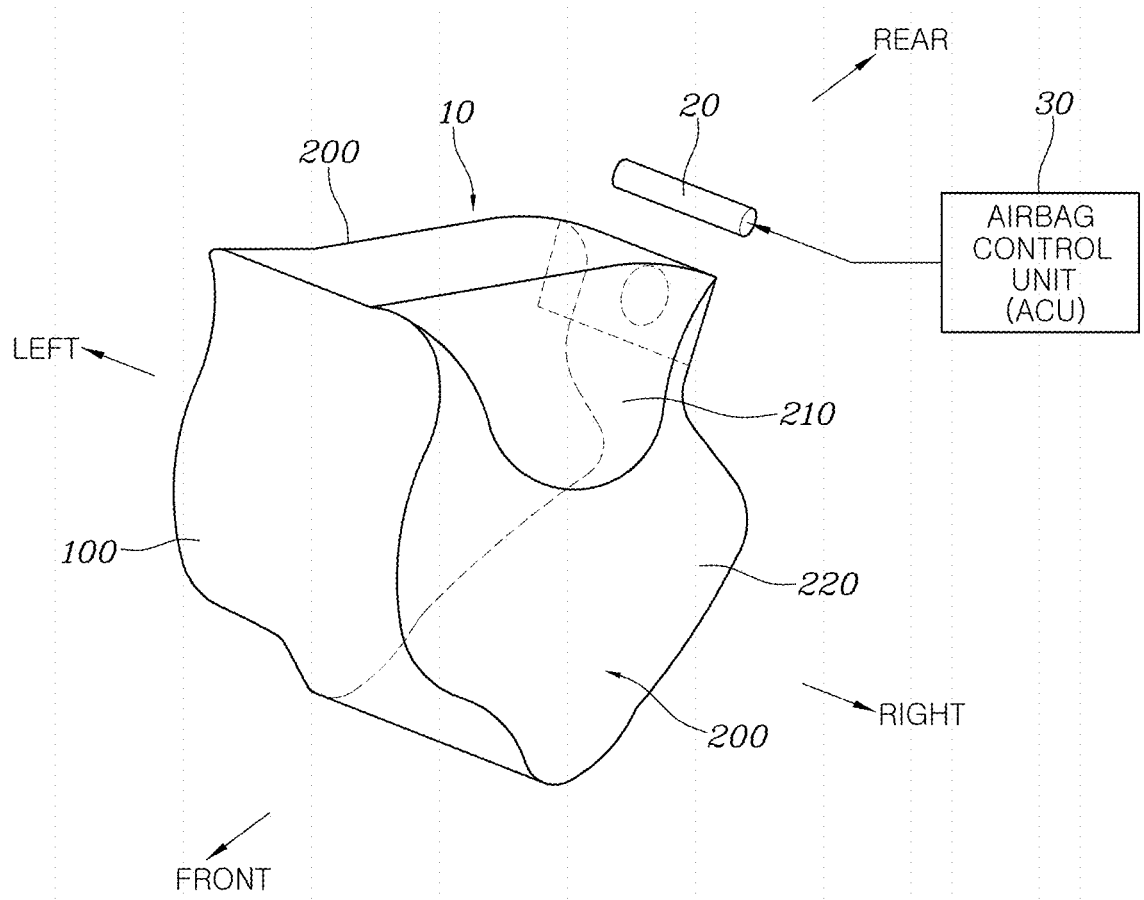
FIG. 1 is a view of an airbag cushion and an airbag apparatus for a passenger seat according to the present invention.

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

A controller (a control unit) according to exemplary embodiments of the present invention may be implemented through a processor (not shown) configured to execute the operation to be described below using nonvolatile memory (not shown), which is configured to store an algorithm for controlling the operation of various components of a vehicle or data related to a software command for executing the algorithm, and data stored in the memory. Here, the memory and the processor may be implemented as individual chips. Alternatively, the memory and the processor may be implemented as a single integrated chip. The processor may alternatively take the form of one or more processors.

Hereinafter, an airbag cushion and an airbag apparatus for a passenger seat including the same according to exemplary embodiments of the present invention will be described with reference to the accompanying drawings.

As shown in FIGS. 1 to 8, an airbag cushion 10 according to the present invention includes a main center panel portion 100, which is deployed toward a passenger seat, and a side panel portion 200, which is sewn to the main center panel portion 100 and is located on the left and right sides of the main center panel portion 100 to form the side surface of the airbag cushion 10.

The side panel portion 200 is divided into a first panel portion 210 and a second panel portion 220. The first panel portion 210 and the second panel portion 220 are sewn to each other.

The first panel portion 210 is an upper panel portion, which is located above the second panel portion 220, and the second panel portion 220 is a lower panel portion, which is located below the first panel portion 210.

The first panel portion 210 and the second panel portion 220 are disposed in an upward-downward direction, and are connected to each other via sewn sections 230, at which predetermined parts of the first panel portion 210 and predetermined parts of the second panel portion 220 are sewn to each other. A non-sewn section between the first panel portion 210 and the second panel portion 220 forms an overlap region 240, in which a predetermined region of the first panel portion 210 and a predetermined region of the second panel portion 220 overlap each other. The overlap region 240 forms an open gap 250 until the cushion is fully deployed in order to vent an airbag gas outside therethrough (refer to the arrows M1 shown in FIGS. 1 and 4).

In the state in which the first panel portion 210 and the second panel portion 220 are disposed in the upward-downward direction, the front boundary portion therebetween and the rear boundary portion therebetween become the sewn sections 230, and the intermediate section between the sewn sections 230 becomes the non-sewn section, in which the overlap region 240 is formed.

The overlap region 240 is a region in which a predetermined region of the first panel portion 210 and a predetermined region of the second panel portion 220 overlap each other. The overlap region 240 is formed in such a manner that the middle region of the first panel portion 210 other than the sewn sections 230 covers the outer surface of the second panel portion 220.

The overlap region 240 between the first panel portion 210 and the second panel portion 220 forms the gap 250 between the first panel portion 210 and the second panel portion 220. The gap 250 is an open passage that communicates with the outside. The gap 250 is maintained in an open state until the cushion is fully deployed in order to vent the airbag gas outside, thereby reducing the internal pressure in the cushion and thus alleviating impacts.

The airbag cushion 10 according to the present invention includes a tether 300, which interconnects the left upper end and the right upper end of the second panel portion 220, which are located inside the overlap region 240, and a cord 400, which interconnects the left lower end and the right lower end of the first panel portion 210, which are located outside the overlap region 240.

Figure 2:
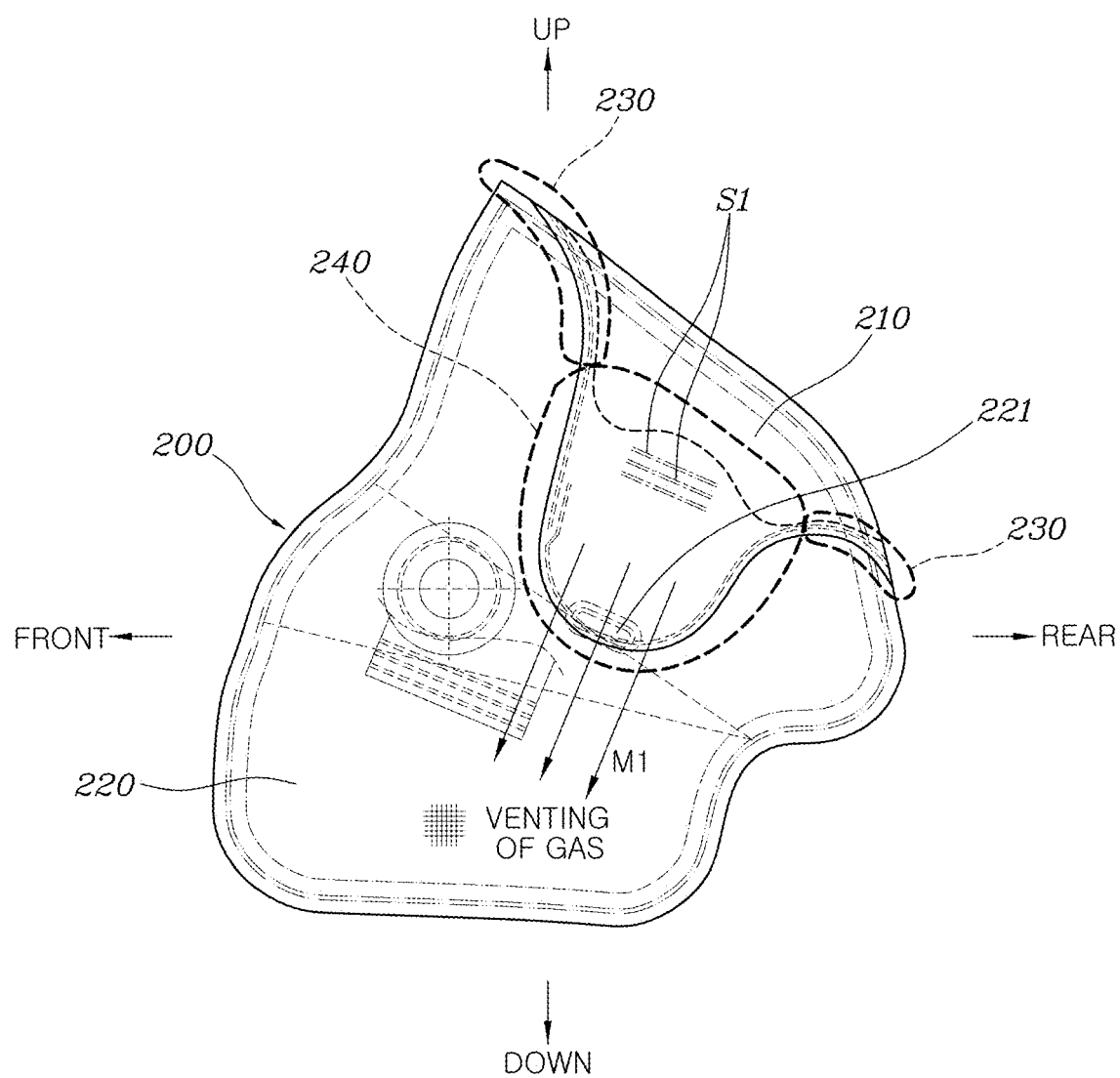
FIG. 2 is a view of a side panel portion of the airbag cushion according to the present invention.
Figure 3:
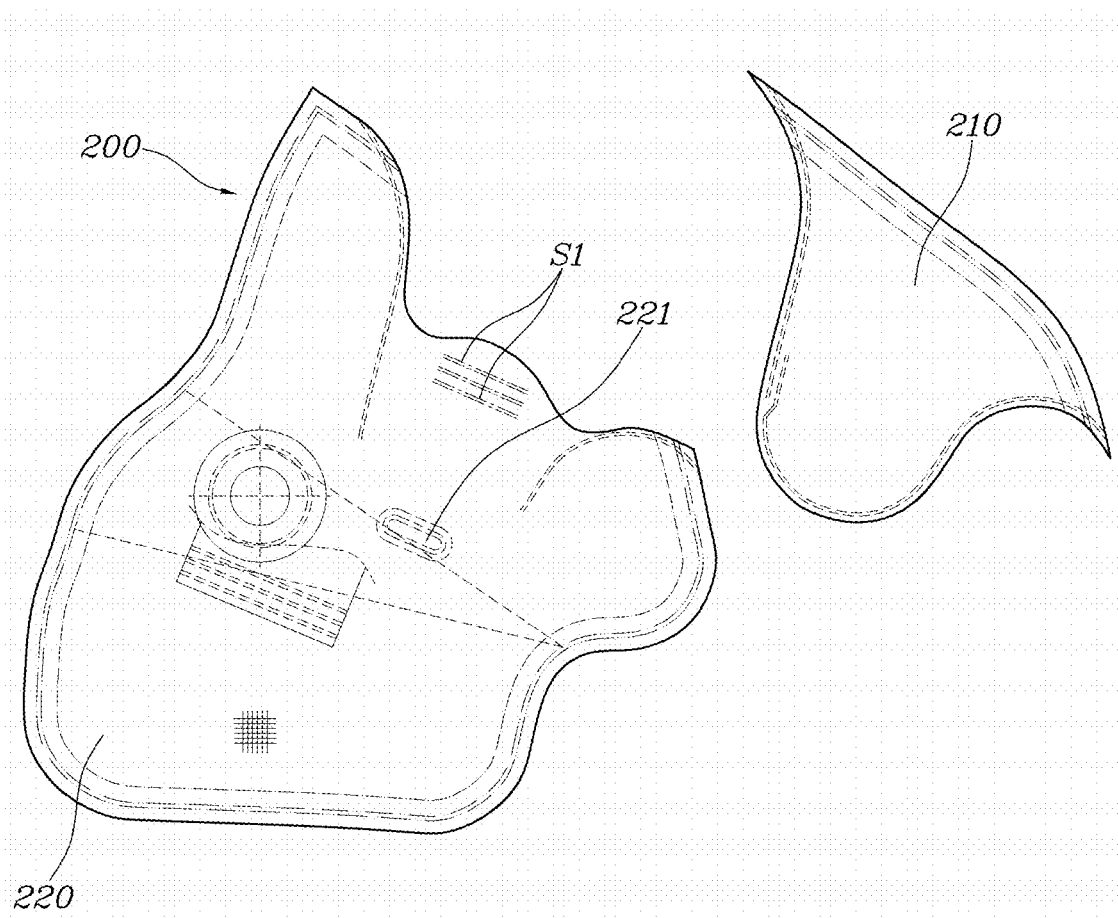
FIG. 3 is an exploded view of a first panel portion and a second panel portion of the side panel portion.
Figure 4:
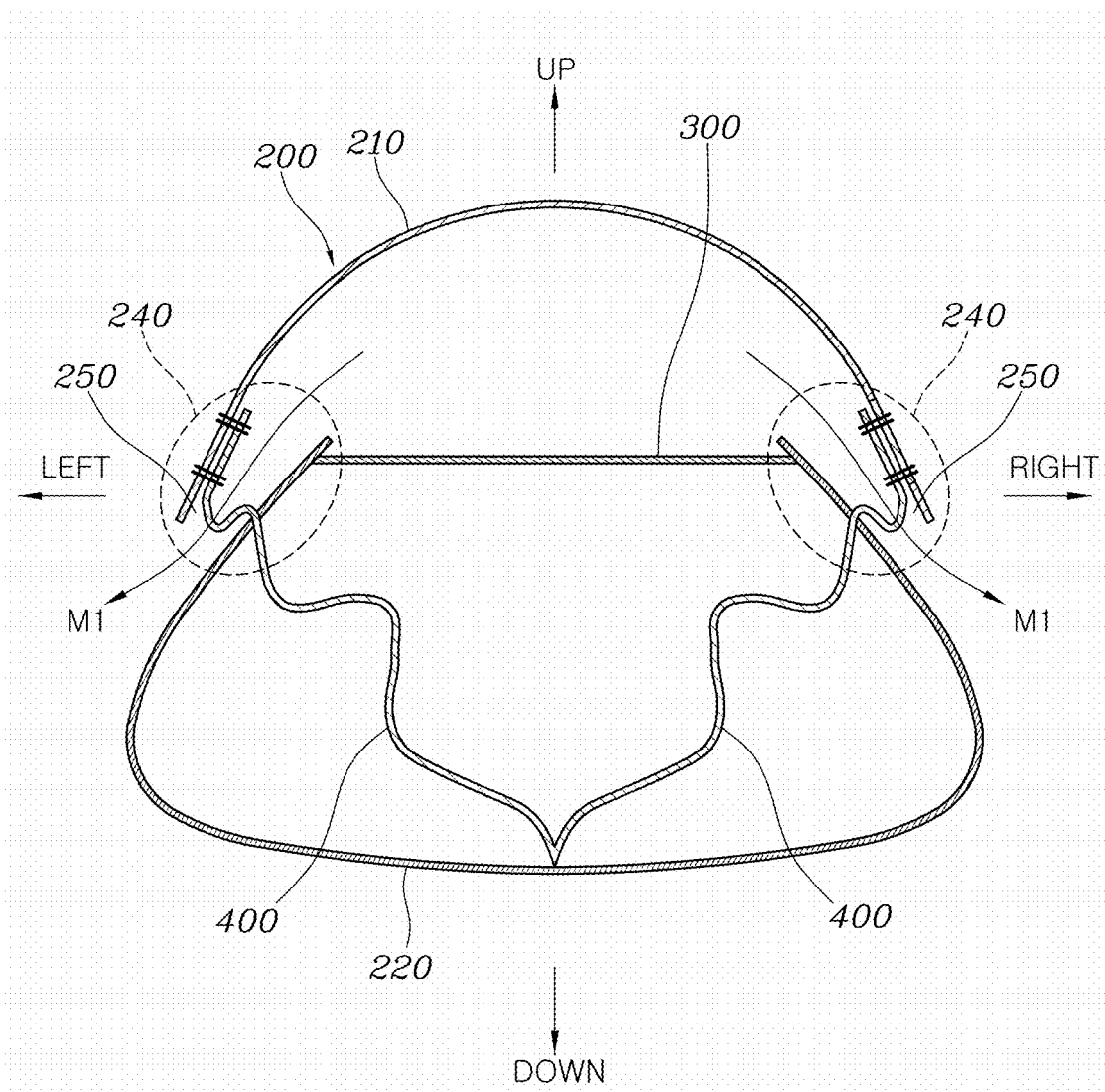
FIG. 4 is a cross-sectional view of the side panel portion according to the present invention cut in a forward-backward direction, which illustrates the state in which a gap between the first panel portion and the second panel portion is opened during initial deployment.
Figure 5:
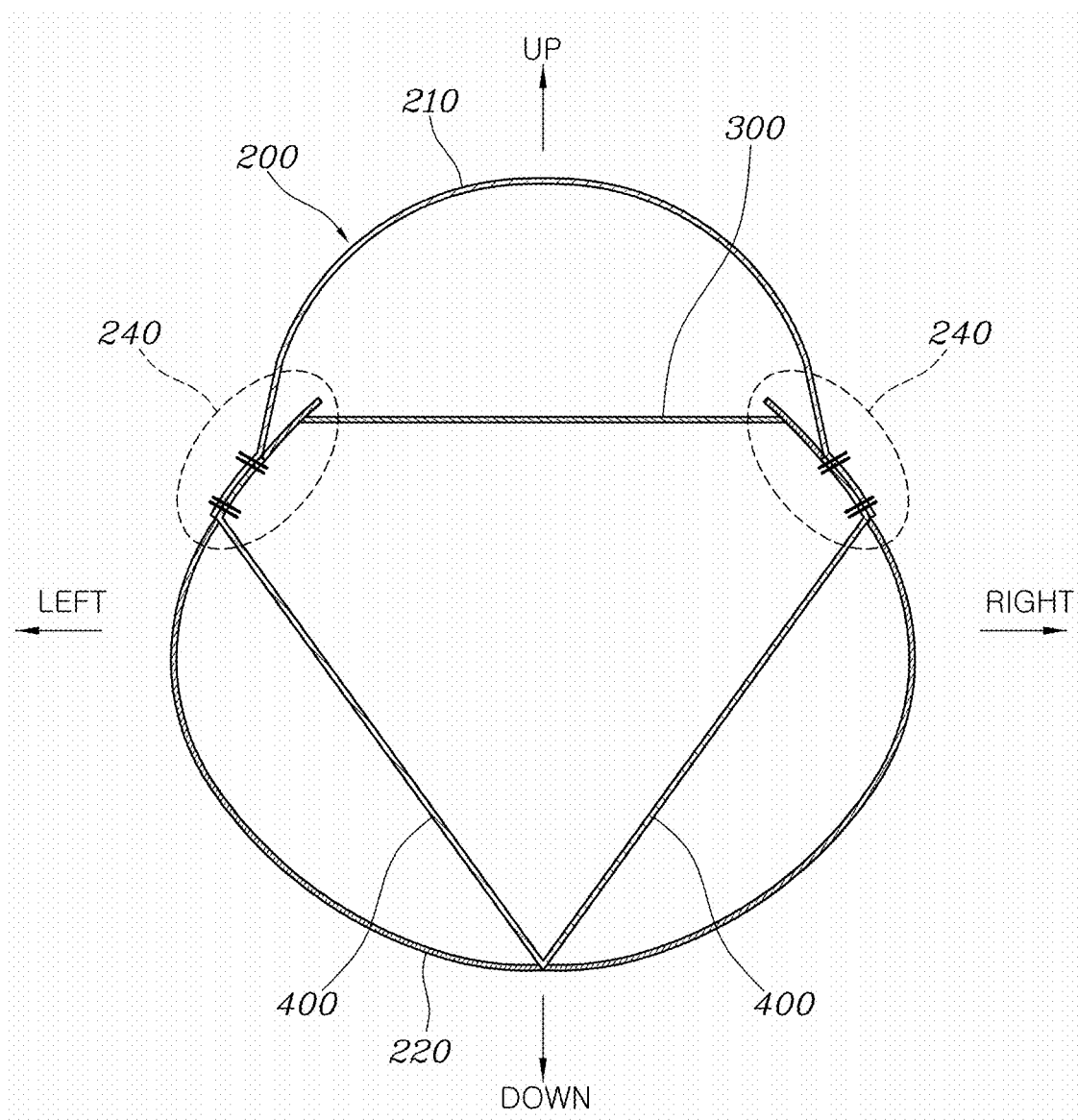
FIG. 5 is a view illustrating the state in which the gap between the first panel portion and the second panel portion is closed when the airbag cushion is fully deployed.
Figure 6:
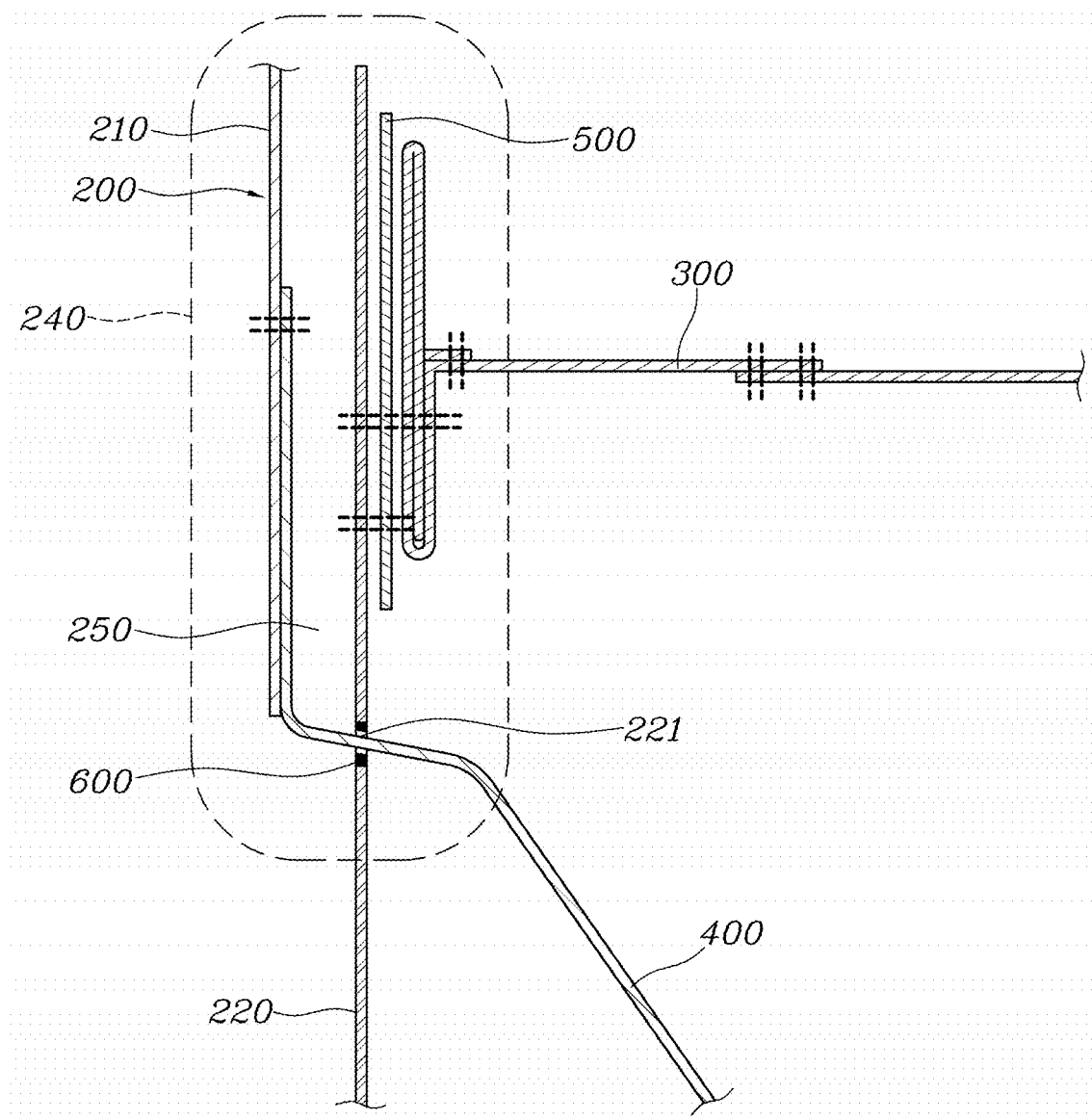
FIG. 6 is an enlarged view of an overlap region between the first panel portion and the second panel portion.

Reference numeral S1 shown in each of FIGS. 2 and 3 denotes a tether-coupling portion of the second panel portion 220, to which an end of the tether 300 is sewn.

When the cushion is deployed, the tether 300 pulls the upper end of the second panel portion 220 in the inward direction, thereby expanding the open gap 250 formed in the overlap region 240. Accordingly, a sufficient amount of airbag gas is vented through the gap 250 until the cushion is fully deployed, whereby the internal pressure in the cushion is reduced, and thus impacts are sufficiently alleviated.

The part of the second panel portion 220 to which each of the two ends of the tether 300 is coupled needs to sufficiently withstand the pulling force applied thereto from the tether 300. To this end, the airbag cushion further includes a second-panel-reinforcing member 500, which is located between each of the two ends of the tether 300 and the second panel portion 220 and is integrally sewn to the tether 300 and the second panel portion 220.

The second-panel-reinforcing member 500 reinforces the part of the second panel portion 220 to which each of the two ends of the tether 300 is coupled, thereby preventing the second panel portion 220 from being torn or damaged by the pulling force applied thereto from the tether 300 when the cushion is deployed.

When the cushion is fully deployed, tension is generated in the cord 400, whereby the first panel portion 210 is brought into close contact with the second panel portion 220 in the overlap region 240.

That is, when the cushion is fully deployed, the first panel portion 210 is pulled by the tension generated in the cord 400, and thus is brought into close contact with the outer surface of the second panel portion 220. Accordingly, the gap 250 formed in the overlap region 240 is closed, and thus venting of the airbag gas outside through the gap 250 is stopped. Accordingly, internal airtightness of the cushion is secured, and the internal pressure in the cushion is maintained, thus effectively and sufficiently protecting the passenger.

The two ends of the cord 400 are sewn to the lower end of the first panel portion 210, which is located outside the overlap region 240. The cord 400 is inserted into the second panel portion 220 from outside through a slit 221 formed in the second panel portion 220, and the middle portion of the cord 400 is sewn to the lower end of the main center panel portion 100.

The slit 221 formed in the second panel portion 220, through which the cord 400 passes, has relatively low durability, and thus is likely to be torn or damaged due to friction with the cord 400 when the cord 400 passes therethrough. In order to prevent this problem, a slit-reinforcing member 600 is coupled to the portion of the second panel portion 220, in which the slit 221 is formed.

The slit-reinforcing member 600 reinforces the portion of the second panel portion 220, in which the slit 221 is formed, thereby preventing the slit 221 from being torn or damaged by the cord 400.

When the airbag cushion 10 is fully deployed, the internal pressure therein needs to be maintained in order to protect the passenger. To this ends, when the airbag cushion 10 is fully deployed, the gap 250 formed in the overlap region 240 needs to be maintained in a closed state.

In order to maintain the closed state of the gap 250, the embodiment according to the present invention further includes a stopper.

Figure 7:
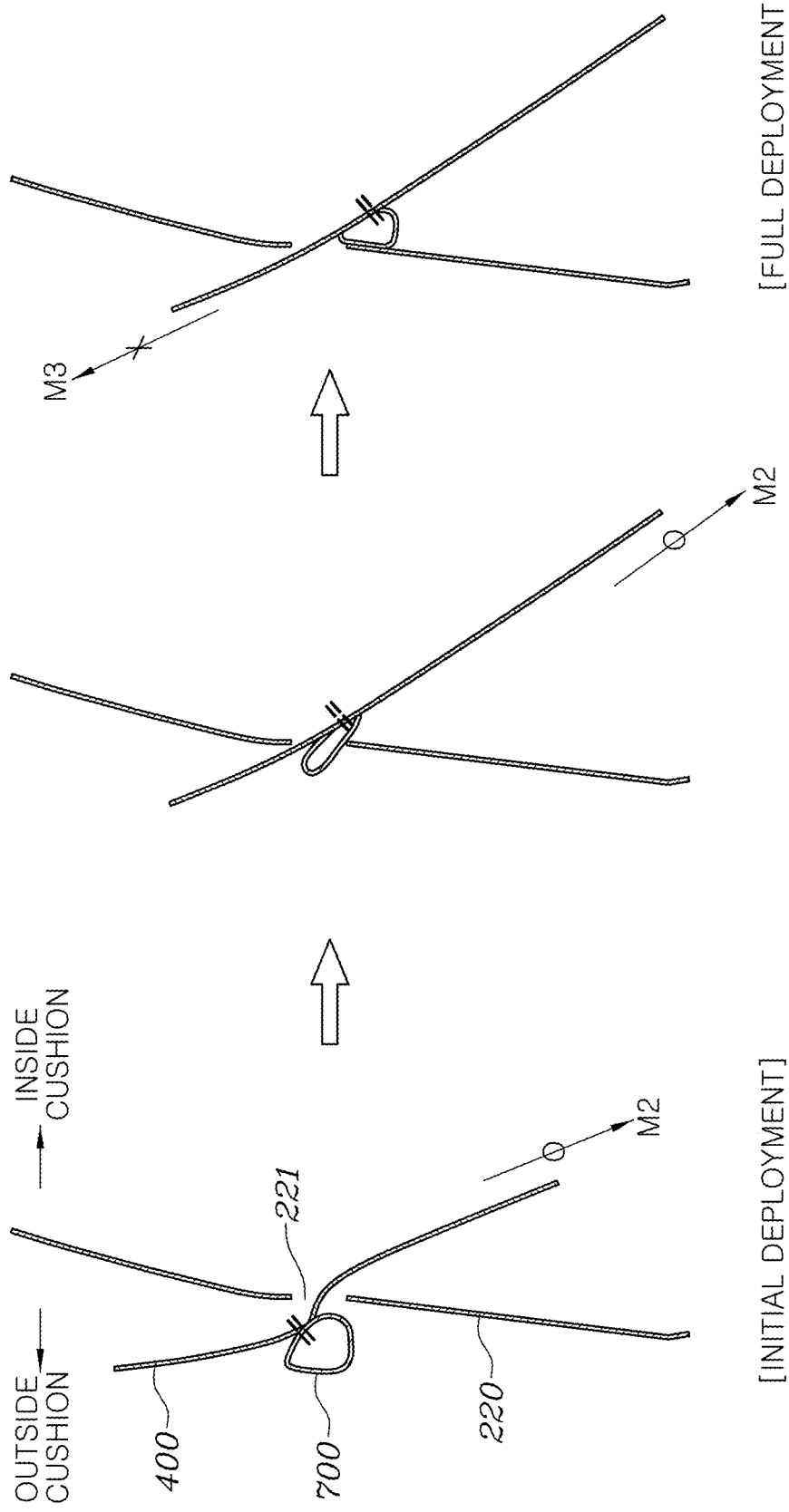

A stopper of a first embodiment is a separate-type stopper 700 that is sewn to the cord 400, as shown in FIG. 7.

The separate-type stopper 700 may be formed as an elastic member that is deformed when external force is applied thereto and then is restored when the external force is removed.

In the state in which no external force is applied thereto, the separate-type stopper 700 may have a larger size than the slit 221 in the second panel portion 220.

Before the cushion is deployed and when the cushion is initially deployed, the separate-type stopper 700 is located outside the second panel portion 220. When the cushion is deployed to a certain extent and thus tension is generated in the cord 400, the separate-type stopper 700 is inserted into the second panel portion 220 through the slit 221 in the second panel portion 220. When the cushion is fully deployed, the separate-type stopper 700 is caught and fixed by the slit 221 in the second panel portion 220, and thus does not escape out of the second panel portion 220.

When the separate-type stopper 700 passes through the slit 221, the size thereof is reduced so as to be smaller than that of the slit 221, whereby the separate-type stopper 700 is capable of smoothly passing through the slit 221 (refer to the arrow M2). After the separate-type stopper 700 passes through the slit 221, the size thereof is restored to the original size thereof so as to be larger than that of the slit 221, whereby the separate-type stopper 700 prevents the cord 400 from moving in the outward direction of the second panel portion 220 (refer to the arrow M3).

A stopper of a second embodiment is an integral-type stopper 800 that is integrally formed with the cord 400, as shown in FIG. 8.

The integral-type stopper 800 is formed in such a manner that a portion of the cord 400 is formed in a zigzag shape and the zigzag sections are sewn to each other so as to maintain the zigzag shape.

The integral-type stopper 800 may be made of the same material as the cord 400. The integral-type stopper 800 may be deformed when external force is applied thereto and may then be restored when the external force is removed.

In the state in which no external force is applied thereto, the integral-type stopper 800 may have a larger size than the slit 221 in the second panel portion 220.

Before the cushion is deployed and when the cushion is initially deployed, the integral-type stopper 800 is located outside the second panel portion 220. When the cushion is deployed to a certain extent and thus tension is generated in the cord 400, the integral-type stopper 800 is inserted into the second panel portion 220 through the slit 221 in the second panel portion 220. When the cushion is fully deployed, the integral-type stopper 800 is caught and fixed by the slit 221 in the second panel portion 220, and thus does not escape out of the second panel portion 220.

When the integral-type stopper 800 passes through the slit 221, the size thereof is reduced so as to be smaller than that of the slit 221, whereby the integral-type stopper 800 is capable of smoothly passing through the slit 221 (refer to the arrow M2). After the integral-type stopper 800 passes through the slit 221, the size thereof is restored to the original size thereof so as to be larger than that of the slit 221, whereby the integral-type stopper 800 prevents the cord 400 from moving in the outward direction of the second panel portion 220 (refer to the arrow M3).

An airbag apparatus for a passenger seat according to an embodiment of the present invention may include the airbag cushion 10 described above, an inflator 20, and an airbag control unit 30.

In detail, the airbag apparatus for a passenger seat according to the present invention includes the airbag cushion 10, in which the side panel portion 200 forming both side surfaces thereof includes the first panel portion 210 located at an upper position and the second panel portion 220 located at a lower position and in which the first panel portion 210 and the second panel portion 220 are connected to each other via the sewn sections 230 formed by sewing predetermined parts of the first panel portion 210 and predetermined parts of the second panel portion 220 to each other and have a non-sewn section therebetween, which is formed at the middle parts of the first panel portion 210 and the second panel portion 220 and forms the overlap region 240 having the open gap 250 communicating with the outside, the inflator 20 coupled to the airbag cushion 10 and configured to generate an airbag gas, and the airbag control unit 30 configured to control operation of the inflator 20.

As is apparent from the above description, according to the embodiments of the present invention, the side panel portion 200 of the airbag cushion 10 is divided into the first panel portion 210, which is disposed at an upper position, and the second panel portion 220, which is disposed at a lower position, the open gap 250 communicating with the outside is formed in the overlap region 240 between the first panel portion 210 and the second panel portion 220, and an LRD vent for the airbag cushion 10 is formed using the open gap 250. Accordingly, it is possible to simplify the configuration for forming the LRD vent, to reduce the number of parts, to simplify the structure for connecting the parts, to make it easy to change the size or the design of the apparatus for the purpose of improving injury prevention performance, and to minimize the size of the area occupied by parts protruding outside the cushion, thus making the apparatus advantageous from the aspect of folding and packaging.

Although specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag cushion comprising:
   a side panel portion forming a side surface of the airbag cushion, the side panel portion comprising a first panel portion and a second panel portion, wherein:
   the first panel portion and the second panel portion are connected to each other via sewn sections comprising predetermined parts of the first panel portion and predetermined parts of the second panel portion sewn to each other and having a non-sewn section therebetween,
   in the non-sewn section, the first panel portion and the second panel portion have regions overlapping each other to form an overlap region,
   the overlap region forms an open gap until the airbag cushion is fully deployed to vent an airbag gas,
   the first panel portion and the second panel portion are disposed in an upward-downward direction,
   the sewn sections correspond to a front boundary portion and a rear boundary portion between the first panel portion and the second panel portion, and
   the overlap region corresponds to an intermediate section between the sewn sections.

2. The airbag cushion according to claim 1, further comprising:
   a tether interconnecting a left upper end and a right upper end of the second panel portion located inside the overlap region,
   wherein, when the airbag cushion is deployed, the tether pulls the left upper end and the right upper end of the second panel portion in an inward direction to expand the open gap formed in the overlap region.

3. The airbag cushion according to claim 2, further comprising:
   a second-panel-reinforcing member located between ends of the tether and the second panel portion and integrally sewn to the tether and the second panel portion.

4. The airbag cushion according to claim 1, further comprising:
   a cord interconnecting a left lower end and a right lower end of the first panel portion located outside the overlap region,
   wherein, when the airbag cushion is fully deployed, tension is generated in the cord so that the first panel portion contacts the second panel portion in the overlap region, whereby the open gap formed in the overlap region is closed to stop venting of the airbag gas, and internal airtightness of the airbag cushion is secured.

5. The airbag cushion according to claim 4, wherein the cord has two ends respectively sewn to the left lower end and the right lower end of the first panel portion located outside the overlap region, is inserted into the second panel portion through a slit formed in the second panel portion, and has a middle portion coupled to a lower end of a main center panel portion.

6. The airbag cushion according to claim 5, further comprising:
   a slit-reinforcing member coupled to a portion having the slit formed in the second panel portion.

7. The airbag cushion according to claim 5, wherein the cord is provided with a separate stopper sewn thereto,
   wherein the separate stopper is located outside the second panel portion before the airbag cushion is deployed,
   wherein, when the airbag cushion is deployed and tension is generated in the cord, the separate stopper is inserted into the second panel portion through the slit in the second panel portion, and
   wherein, when the airbag cushion is fully deployed, the separate stopper is caught and fixed by the slit in the second panel portion.

8. The airbag cushion according to claim 7, wherein the separate stopper is formed as an elastic member configured to be deformed when an external force is applied thereto and to be restored when the external force is removed, and, when no external force is applied, the separate stopper has a larger size than the slit in the second panel portion.

9. The airbag cushion according to claim 5, wherein the cord is provided with an integral stopper integrally formed therewith, wherein, before the airbag cushion is deployed, the integral stopper is located outside the second panel portion, when the airbag cushion is deployed and tension is generated in the cord, the integral stopper is inserted into the second panel portion through the slit in the second panel portion, and when the airbag cushion is fully deployed, the integral stopper is caught and fixed by the slit in the second panel portion.

10. An airbag cushion comprising:

a side panel portion forming a side surface of the airbag cushion, the side panel portion comprising a first panel portion and a second panel portion, wherein:

the first panel portion and the second panel portion are connected to each other via sewn sections comprising predetermined parts of the first panel portion and predetermined parts of the second panel portion sewn to each other and having a non-sewn section therebetween, in the non-sewn section, the first panel portion and the second panel portion have regions overlapping each other to form an overlap region, the overlap region forms an open gap until the airbag cushion is fully deployed to vent an airbag gas, and the first panel portion is located above the second panel portion, and has front and rear portions sewn to the second panel portion to form the sewn sections, and the first panel portion has a middle region other than the sewn sections, the middle region covering an outer surface of the second panel portion to form the overlap region.

11. An airbag cushion comprising:

a main center panel portion; and a pair of side panel portions coupled to both sides of the main center panel portion, each of the pair of side panel portions comprising a first panel portion located at an upper position and a second panel portion separately provided from the first panel portion and located at a lower position, wherein the first panel portion and the second panel portion are connected to each other via sewn sections comprising predetermined parts of the first panel portion and predetermined parts of the second panel portion sewn to each other, and having regions overlapping each other to form an overlap region, and wherein the overlap region between the first panel portion and the second panel portion has an open gap to outside the side panel portions.

12. The airbag cushion according to claim 11, wherein the open gap formed between the first panel portion and the second panel portion is maintained in an open state until the airbag cushion is fully deployed to vent an airbag gas, and wherein, when the airbag cushion is fully deployed, the first panel portion contacts the second panel portion, and the open gap is closed to stop venting of the airbag gas.

13. The airbag cushion according to claim 11, further comprising:

a tether interconnecting a left upper end and a right upper end of the second panel portion located inside the overlap region; and a cord interconnecting a left lower end and a right lower end of the first panel portion located outside the overlap region.

14. The airbag cushion according to claim 13, wherein the tether pulls the left upper end and the right upper end of the second panel portion in an inward direction to expand the open gap formed in the overlap region when the airbag cushion is deployed.

15. The airbag cushion according to claim 13, wherein, when the airbag cushion is fully deployed, tension is generated in the cord so that the first panel portion contacts the second panel portion in the overlap region, whereby the open gap formed in the overlap region is closed to stop venting of an airbag gas, and internal airtightness of the airbag cushion is secured.

16. An airbag apparatus for a passenger seat, the airbag apparatus comprising:

an airbag cushion comprising a side panel portion forming both side surfaces thereof, the side panel portion comprising a first panel portion located at an upper position and a second panel portion located at a lower position, the first panel portion and the second panel portion being connected to each other via sewn sections comprising predetermined parts of the first panel portion and predetermined parts of the second panel portion sewn to each other and having a non-sewn section therebetween, the non-sewn section being formed at middle parts of the first panel portion and the second panel portion and forming an overlap region having an open gap to an outside of the side panel portions;

an inflator coupled to the airbag cushion and configured to generate an airbag gas; and an airbag control unit configured to control operation of the inflator.

17. The airbag apparatus according to claim 16, wherein the airbag cushion further comprises a tether interconnecting a left upper end and a right upper end of the second panel portion located inside the overlap region, and when the airbag cushion is deployed, the tether pulls the left upper end and the right upper end of the second panel portion in an inward direction to expand the open gap formed in the overlap region.

18. The airbag apparatus according to claim 16, wherein the airbag cushion further comprises a cord interconnecting a left lower end and a right lower end of the first panel portion located outside the overlap region, and when the airbag cushion is fully deployed, tension is generated in the cord so that the first panel portion contacts the second panel portion in the overlap region, whereby the open gap formed in the overlap region is closed to stop venting of the airbag gas, and internal airtightness of the airbag cushion is secured.

* * * * *